United States Patent [19]
Kim et al.

[11] Patent Number: 6,153,272
[45] Date of Patent: Nov. 28, 2000

[54] LIQUID CRYSTAL ALIGNMENT BY COVALENTLY BOUND ANISOTROPES

[75] Inventors: Dong-Yu Kim, Lowell; Jayant Kumar, Westford; Sukant Tripathy, Acton, all of Mass.

[73] Assignee: University of Massachusetts Lowell, Lowell, Mass.

[21] Appl. No.: 09/080,598

[22] Filed: May 18, 1998

[51] Int. Cl.$^7$ .......................... C09K 19/56; G02F 1/1337
[52] U.S. Cl. ...................... 428/1.5; 252/299.4; 349/135; 349/191; 428/1.2; 428/1.31
[58] Field of Search ........................ 252/299.01, 299.4; 428/1.1, 1.6, 1.5, 1.31, 1.2; 349/84, 124, 133, 135, 191

[56] References Cited

U.S. PATENT DOCUMENTS

| | | | |
|---|---|---|---|
| 4,974,941 | 12/1990 | Gibbons et al. | 384/45 |
| 5,223,356 | 6/1993 | Kumar et al. | 430/1 |
| 5,578,351 | 11/1996 | Shashidhar et al. | 428/1 |
| 5,807,498 | 9/1998 | Gibbons et al. | 252/299.4 |

FOREIGN PATENT DOCUMENTS 55-134808  10/1980  Japan.

OTHER PUBLICATIONS

Jp 55-134,808 English abstract, Jan. 8, 1981.

Gibbons, W.M. and Sun, S-T, "Optically generated liquid crystal gratings," *Appl. Phys. Lett.* 65(20):2542-2544 (1994).

Mandal, B.K., et al., "New photocrosslinkable polymers for second-order nonlinear optical processes," *Makromol. Chem., Rapid Commun.* 12(11):7-12 (1991).

Jiang, X.L., et al., "Polarization dependent recordings of surface relief gratings on azobenzene containing polymer films," *Appl. Phys. Lett* 68(19):2618-2620 (1996).

Gibbons, W.M., et al., "Surface-mediated alignment of nematic liquid crystals with polarized laser light," *Nature* 351:49-50 (1991).

Sukwattanasinitt, M., et al., "Functionalizable Self-Assembling Polydiacetylenes and Their Optical Properties," *Chem. Mater.* 10:27-29 (1998).

Cull, B., et al., "Anisotropic surface morphology of poly(vinyl 4-methoxy-cinnamate) and 12-8(poly)diacetylene thin films induced by linear photopolymerization," *Physical Review E* 53(4):3777-3781 (1996).

Kikuchi, H., et al., "Mechanisms of Liquid Chrystal Alignment on Buffed Polyimide Surfaces," Antec:2621-2622 (1995).

Kumar, Jayant, et al., "Gradient force: the mechanism for surface relief grating formation in azobenzene functionalized polymers," *Appl. Phys. Lett.*:1-3 (Nov. 26, 1997).

Lee, T.S., et al., "Photoinduced Surface Relief Gratings in High-$T_g$ Main-Chain Azoaromatic Polymer Films," *J. of Polymer Science*:36:283-289 (1998).

Kim, D.Y., et al., "Polarized Laser Induced Holographic Surface Relief Gratings on Polymer Films," *Macromolecules* 28:8835-8839 (1995).

Gupta, V.K. and Abbott, N.L., "Design of Surfaces for Patterned Alignment of Liquid Crystals on Planar and Curved Substrates," *Science* 276:1533-1536 (1997).

Schadt, M. et al., "Optical patterning of multi-domain liquid-crystal displays with wide viewing angles," *Nature* 381:212-215 (1996).

Kim, D.Y., et al., "Photofabrication of Surface Relief Gratings," ACS Symposium Series 672:251-259, Samson A. Jenekhe and Kenneth J. Wynne, Eds., published by the American Chemical Society (1997).

*Primary Examiner*—Shean C. Wu
*Attorney, Agent, or Firm*—Hamilton, Brook, Smith & Reynolds, P.C.

[57] ABSTRACT

A polymer surface in contact with a liquid crystal medium is exposed to polarized light, whereby a covalently bound anisotropic component of the polymer surface aligns in response to the polarized light. Alignment of the anisotropic component causes alignment of the liquid crystal medium. An interference pattern of two polarized lights causes the covalently bound anisotropic component to form microgrooves on the polymer surface. A liquid crystal cell includes at least one polymer surface that has a covalently bound anisotropic component that can align in response to polarized light and a liquid crystal in contact with the polymer surface.

54 Claims, 2 Drawing Sheets

LIQUID CRYSTAL ALIGNMENT BY COVALENTLY BOUND ANISOTROPES

GOVERNMENT SUPPORT

The invention was supported, in whole or in part, by a grant N 0014-90-J-1148 from the Office of Naval Research and by a grant DMR-9312063 from the National Science Foundation. The Government has certain rights in the invention.

BACKGROUND OF THE INVENTION

Many electro-optic devices, such as flat panel displays, employ liquid crystal cells. Generally, liquid crystal cells include a liquid crystal medium between two polymer surfaces. Liquid crystals are organic compounds that are in an intermediate or mesomorphic state between solid and liquid phases. They are also birefringent as a consequence of a tendency of constituent liquid crystal molecules to align.

Typically, the polymer surfaces of liquid crystal cells are formed by unidirectionally rubbing a suitable polymer, such as a polyimide thin film coating, with a velvet cloth. Rubbing of the polymer causes orientation of the functional groups and formation of the parallel grooves. Orientation of the functional groups and formation of grooves in this manner causes alignment of liquid crystal molecules and a consequent uniform appearance of the liquid crystal medium. Application of an external motive force, such as an electric field, can then cause at least a portion of the liquid crystal to realign, thereby changing the appearance of that portion of the medium.

However, formation of liquid crystal cells by rubbing the polymer surfaces has several disadvantages. For example, rubbing often generates dust and causes accumulation of static charge. Both of these problems can, in turn, cause the formation of defects in the liquid crystal cell, or even failure of the electro-optical device incorporating a defective liquid crystal cell.

Therefore, a need exists for a method of liquid crystal alignment and for a method of fabricating liquid crystal cells that overcome or minimize the above-referenced problems.

SUMMARY OF THE INVENTION

The present invention relates to a method of aligning a liquid crystal medium, to a liquid crystal cell that employs the method of aligning the liquid crystal medium, and to a method of fabricating such a liquid crystal cell.

The method of aligning the liquid crystal medium includes exposing a polymer surface in contact with the liquid crystal medium to polarized light, wherein the polymer surface has a covalently bound anisotropic component that aligns in response to the polarized light, thereby aligning the liquid crystal medium.

In another embodiment, the method includes exposing a polymer surface in contact with the liquid crystal medium to an interference pattern of two polarized lights, wherein the polymer surface has a covalently bound anisotropic component that aligns to form microgrooves on the polymer surface in response to the interference pattern of the polarized lights, thereby aligning the liquid crystal medium.

A liquid crystal cell of the invention includes at least one polymer surface that has a covalently bound anisotropic component that can align in response to polarized light, and a liquid crystal medium in contact with the polymer surface.

A method of forming a liquid crystal cell includes filling a cell with a least one liquid crystal medium. The cell has at least one polymer surface in contact with the liquid crystal medium. The polymer has a covalently bound anisotropic component that can align in response to polarized light, thereby aligning the liquid crystal medium.

It has been discovered that a liquid crystal medium in contact with the polymer surface having an aligned covalently bound anisotropic component can align in response to alignment of the anisotropic component. In particular, it has been discovered that orientation of the anisotropic component of a polymer surface can dominate the orientation of liquid crystals, despite the presence of grooves in the polymer surface.

Exposure of a polymer film having a covalently bound anisotropic component to an interference pattern of polarized light by the method of the invention can generate both well defined microgroove structures and specific desired orientation of the anisotropic component of the polymer film. As a result, even greater stability of liquid crystals can be obtained, such as by employing both grooves and anisotropic groups to align liquid crystals. Polymer films having a covalently bound anisotropic component that have been optically orientated by exposure to polarized light are stable for extended periods of time (e.g. two years or more) when stored at temperatures below their glass transition temperature (hereinafter "Tg"). Therefore, it is expected that the utility of liquid crystal cells employing such polymer surfaces can be extended significantly. Further, suitable polymer surfaces for alignment of liquid crystal by the method of the invention can be formed without generation of dust or accumulation of static charge, such as often occurs by rubbing a polymer surface to form grooves.

DETAILED DESCRIPTION OF THE INVENTION

The features and other details of the method of the invention will now be more particularly described. It will be understood that the particular embodiments of the invention are shown by way of illustration and not as limitations of the invention. The principle features of this inventions can be employed in various embodiments without departing from the scope of the invention.

The invention generally is directed to controlling alignment of a liquid crystal medium by aligning a covalently bound anisotropic component of a polymer in contact with the liquid crystal medium. Polarized light is used to induce an orientation of the anisotropic component in the polymer film and/or to induce a change in surface topology of the polymer film. Alignment of the liquid crystal medium is a consequence of contact with the microgrooves formed in the surface of the polymer and/or contact with the aligned anisotropic functional component.

Polymers of the polymer surface that are suitable for use with the present invention generally should be amorphous in order to permit transmission of light. However, a wide variety of polymer backbones can be employed and include, for example, acrylate and methacrylate polymers, polyesters, polyamides, polycarbonates, polyethers, polyimides, polyimines, polysaccharide, polyolefins, etc.

The polymer has an anisotropic component, either as a side chain or as a component of the backbone. Anisotropic components are functional groups that exhibit different properties along different axes. An example of anisotropic behavior is birefringent optical absorption, wherein light is absorbed more readily along one axis of the functional group than along another, perpendicular axis.

In one embodiment, the covalently bound anisotropic component is a dichroic dye. Examples of useful dyes include dichroic azo, diazo, triazo, tetraazo, pentaazo, anthraquinone, mercyanine, methine, 2-phenylazothiazole, 2-phenylazobenzthiazole, 4,4'-bis(arylazo)stilbenes, perylene and 4,8-diamino-1,5-naphthoquinone and other dyes that exhibit dichroic absorption bands.

Particularly preferred dichroic dyes are azobenzenes. Examples of preferred azobenzenes are those having the following structure:

wherein,
the aromatic rings can be substituted or unsubstituted,
R is a hydrogen or a polymer,
X is absent or an oxygen, alkylene, sulfur, —$SO_2$—, —$CO_2$—, —$NR^1$—, —$CONR^1$— or a spacer group;
$R^1$ is hydrogen, a substituted or unsubstituted aliphatic group, or a substituted or unsubstituted aromatic group; and
n is zero or an integer from 1–5.

Where R is a hydrogen, the azobenzene group is a side group on the main chain of the polymer. Where R is a polymer, the azobenzene group is incorporated into the main chain of the polymer.

Examples of suitable substituents for the aromatic rings include an aryl group (including a carbocyclic aryl group or a heteroaryl group) or a substituted aryl group which can be attached to the aromatic ring by one bond or fused to the aromatic ring. Examples of other groups that are suitable substituents for the aromatic rings are aliphatic groups, substituted aliphatic groups, hydroxy, —O-(aliphatic group or aryl group), —O-(substituted aliphatic group or substituted aryl group), acyl, —CHO, —CO-(aliphatic or substituted aliphatic group), —CO-(aryl or substituted aryl), —COO-(aliphatic or substituted aliphatic group), —CONH-(hydrogen, aliphatic or substituted aliphatic group), —NH-(acyl), —O-(acyl), benzyl, substituted benzyl, halogenated lower alkyl (e.g. trifluoromethyl and trichloromethyl), fluoro, chloro, bromo, iodo, cyano, nitro, —$SO_3^-$, —SH, —S-(aliphatic or substituted aliphatic group), —S-(aryl or substituted aryl), —S-(acyl), primary amine, —$NHR^1$, —$NR_2'$, or —COOH, wherein R' is an aliphatic group, a substituted aliphatic group, an aromatic group or a substituted aromatic group.

As used herein, aliphatic groups include straight chained, branched or cyclic $C_1$–$C_8$ hydrocarbons which are completely saturated or which contain one or more units of unsaturation.

Aromatic groups also include fused polycyclic aromatic ring systems in which a carbocyclic aromatic ring or heteroaryl ring is fused to one or more other heteroaryl rings. Examples include 2-benzothienyl, 3-benzothienyl, 2-benzofuranyl, 3-benzofuranyl, 2-indolyl, 3-indolyl, 2-quinolinyl, 3-quinolinyl, 2-benzothiazole, 2-benzooxazole, 2-benzimidazole, 2-quinolinyl, 3-quinolinyl, 1-isoquinolinyl, 3-quinolinyl, 1-isoindolyl, 3-isoindolyl, and acridintyl.

A "substituted aliphatic group" can have one or more substituents, e.g., an aryl group (including a carbocyclic aryl group or a heteroaryl group), a substituted aryl group, —O-(aliphatic group or aryl group), —O-(substituted aliphatic group or substituted aryl group), acyl, —CHO, —CO-(aliphatic or substituted aliphatic group), —CO-(aryl or substituted aryl), —COO-(aliphatic or substituted aliphatic group), —NH-(acyl), —O-(acyl), benzyl, substituted benzyl, halogenated lower alkyl (e.g. trifluoromethyl and trichloromethyl), fluoro, chloro, bromo, iodo, cyano, nitro, —SH, —S-(aliphatic or substituted aliphatic group), —S-(aryl or substituted aryl), —S-(acyl) and the like.

In a particularly preferred embodiment, there is one or more substituent on the azobenzene group that is an electron acceptor. Groups that are electron acceptors are aromatic, fluoro, chloro, bromo, iodo, nitro, cyano, trifluoromethyl, acyl, —CHO, —CO-(aliphatic or substituted aliphatic group), —CO-(aryl or substituted aryl), —COO-(aliphatic or substituted aliphatic group), or —COOH.

The spacer group can be a group that has one to about thirty atoms and is covalently bonded to the polymer and the anisotropic group. Generally, the spacer group can be covalently bonded to the anisotropic group and polymer through a functional group. Examples of functional groups are oxygen, alkylene, sulfur, —$SO_2$—, —$CO_2$—, —$NR^1$—, —CO—, or —$CONR^1$—. Spacer groups can be manufactured from, for example, epichlorohydrin, dihaloalkane, and other cross-linking or difunctional compounds.

A suitable liquid crystal medium is in contact with the polymer surface. Liquid crystals are molecules that exhibit stable states intermediate between a liquid and a solid. A liquid crystal medium may contain a single liquid crystal or a mixture of liquid crystals. Liquid crystals may be nematic or smectic. Nematic or smectic liquid crystals can have either a positive or negative net dielectric anisotropy.

Examples of readily available nematic liquid crystal materials which have a positive net dielectric anisotropy that are: cyano-4'-alkylbiphenylas,-4-cyano-4'-alkyloxybiphenyls, 4-alkyl-(4'-cyanophenyl)cyclohexanes, 4-alkyl-(4'-cyanobiphenyl)cyclohexanes, 4-cyanophenyl-4'-alkylbenzoates, 4-cyanophenyl-4'-alkyloxybenzoates, 4-alkyloxyphenyl-4'-cyanobenzoates, 4-alkylphenyl-4'-cyanobenzoates, 1-(4'-alkylphenyl)-4-alkylpyrimidines, 1-(4'-alkylphenyl)-4-cyanopyrimidines, 1-(4'-alkyloxyphenyl)-4-cyanopyrimidines and 1-(4'-cyanophenyl)-4-alkylpyrimidines.

Specific examples of compounds within these families are: 4-cyano-4'-pentylbiphenyl, 4-cyano-4'-hexyloxybiphenyl, trans-4-pentyl-(4'-cyanophenyl)cyclohexane, trans-4-hexyl-(4'-cyanobiphenyl)cyclohexane, 4-cyanophenyl-4'-propylbenzoate, 4-pentyloxyphenyl-4'-cyanobenzoate, 4-hexylphenyl-4'-cyanobenzoate, 4-(4'-pentylphenyl)-4-butylpyrimidine, 1-(4'-butyloxyphenyl)-4-cyanopyrimidine, 1-(4-cyanophenyl)-4-alkylpyrimidine, 4-n-hexylbenzylidene-4'-aminobenzonitrile and 4-cyanobenzylidene-4'-octyloxyaniline. Combinations of all the above are also useful.

Nematic liquid crystals that have a negative net dielectric anisotropy are: 4-alkyloxy-4'-alkyloxyazoxybenzenes, 4-alkyl-4'-alkyloxyazoxybenzenes, 4-alkyl-4'-alkylazoxybenzenes and 4-alkyl-2-cyanophenyl-4'-alkylbiphenyl-1-carboxylates.

Specific examples include: p-azoxyanisole, 4-butyl-4'-hexyloxyazoxybenzene, 4-butyl-4'-acetoxyazoxybenzene, 4,4'-bis(hexyl)azoxybenzene, and 4-pentyl-2-cyanophenyl-4'-heptylbiphenyl-1-carboxylate. Mixtures of negative nematic liquid crystals are also useful in this invention.

Smectic A liquid crystals of positive net dielectric anisotropy include: 4-alkyl-4'-cyanobiphenyls and 4-cyano 4'-alkylbenzylideneanilines, as well as mixtures of 4-alkyl-4'-cyano-p-terphenyls and 4-alkyl-4"-cyanobiphenyls. Also useful are smectic A mixtures derived from electron accepting and electron donating mesogenic cores, for example 4'-alkylphenyl 4-alkylbenzoates and 4'-cyanophenyl-4"-alkyloxybenxoyloxybenzoates.

Specific examples of compounds useful as smectic A liquid crystals with positive dielectric anisotropy are: 4-cyano-4'-octylbenzylideneaniline, 4-decyl-4'-cyanobiphenyl, 4-dodecyl-4"-cyano-p-terphenyl, 4'-heptylphenyl-4-butylbenzoate and 4'-cyanophenyl-4"-octyloxybenzoyloxybenzoate. Combinations of all the above positive smectic A materials are useful.

Representatives of smectic A liquid crystals of negative net dielectric anisotropy that are useful in this invention are 4-alkylphenyl-4-alkyloxy-3-cyanobenzoates, 4-alkyloxyphenyl-4-alkyloxy-3-cyanobenzoates and 4"-alkyloxyphenyl-4'-alkyloxybenzoyloxy-3-cyanobenzoates. Specific examples include: 4'-octylphenyl-4-decyloxy-3-cyanobenzoate, 4'-decyloxyphenyl-4-octyloxy-3-cyanobenzoate and 4'-heptyloxyphenyl-4'-decyloxybenzoyl-3-cyanobenzoate. Eutectic mixtures of these may also be used.

Representative chiral smectic C liquid crystals useful in the practice of this invention include: 4'-alkyloxyphenyl-4-alkyloxybenzoates, 4'-alkyloxybiphenyl-4-alkyloxybenzoates, 4-alkyloxyphenyl-4-alkyloxybiphenylcarboxylates and terpenol esters of 4'-n-alkyloxybiphenyl-4-carboxylates. Specific examples are: 4-(4-methylhexyloxy)phenyl-4-decyloxybenzoate, 4-heptyloxyphenyl-4-(4-methylhexyloxy)benzoate, 4'-octyloxybiphenyl-4-(2-methylbutyloxy)biphenyl-4-carboxylate, and menthyl 4'-n-octyloxybiphenyl-4-carboxylate.

The polymer surface, including the anisotropic component, is exposed to polarized light. Preferably, the polarized light is emitted from a laser, such as an argon, helium-neon or helium-cadmium laser, or from an arc lamp, such as a mercury or xenon lamp.

Exposure of the polymer surface to polarized light causes the anisotropic component of the polymer surface to align. The particular alignment of the anisotropic component depends upon the chemical structure of the component. For example, the mechanism proposed for alignment of azobenzene groups perpendicular to the polarization direction of the light is related to the trans-cis-trans isomerization process of the azo group. Photoexcitation of the azo group is most probable when the long axis of the azobenzene group is parallel to the polarization of the light, while the azobenzene group will be inert to photoexcitation if its orientation is perpendicular to the polarization of the light. When exposed to a polarized light source, the azobenzene groups in a polymer that are parallel to the polarization direction of light have the highest isomerization probability. Thermally induced cis-to-trans isomerization spontaneously follows, and the resulting trans azobenzene groups may orient in any direction having lost their orientational memory. However, those azobenzene groups with a component parallel to the polarization direction of the incoming light will be continuously subjected to this trans-cis-trans isomerization process while azobenzene groups which relaxed back to a direction perpendicular to the polarization direction of the light source will have the lowest isomerization probability and will, for the most part, remain perpendicular. After exposure of the material to polarized light there is a net orientation of the azobenzene groups in the polymer matrix.

In one embodiment, the polymer surface is exposed to a source of linearly polarized light. In another embodiment of the invention, the polymer surface is exposed to an interference pattern of polarized light.

Generally, in order to optically orientate the chromophores in a polymer having a covalently attached anisotropic component, the polarized light must have a wavelength that falls within the absorption band of the anisotropic component. When exposed to polarized light of the correct wavelength, anisotropic groups absorb light energy more readily depending on their orientation to the polarization direction of the light. Components that are orientated so that the axis that absorbs light more readily is parallel to the polarization direction of the light are more likely to absorb the light energy and enter a photoexcitation state, while those that are orientated with this axis perpendicular to the polarization direction of the light are less likely to be in a photoexcitation state. After photoexcitation, the anisotropic component spontaneously relaxes back to the ground state in any orientation direction. Components that are orientated so that the axis that absorbs light more readily is perpendicular to the polarization direction of the light, however, will be less likely to enter a photoexcitation state, and thus, are less likely to reorientate. therefore, when a polymer having anisotropic groups is exposed to polarized light, there is a net orientation of the anisotropic component perpendicular to the polarization direction of the light.

Figure 1:
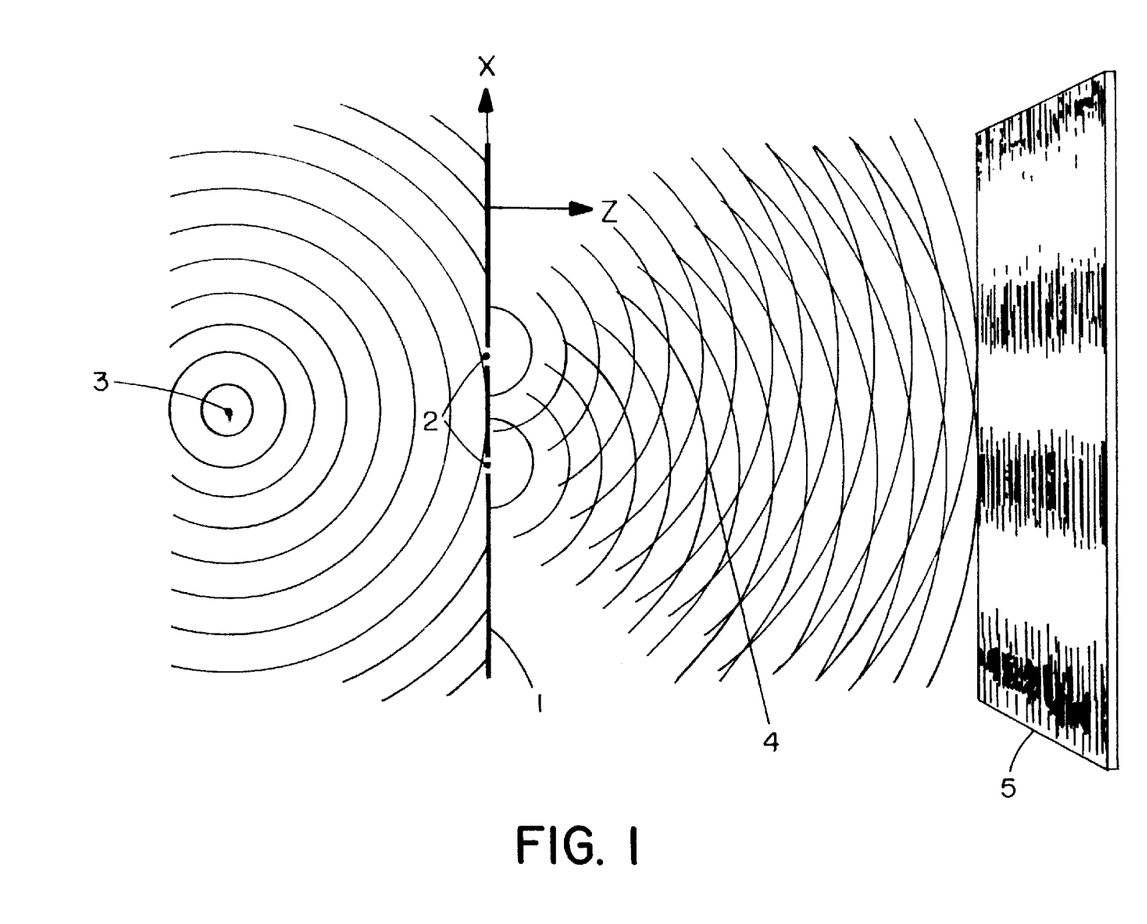
FIG. 1 is a schematic representation of an interference pattern of two monochromatic light beams.

When two monochromatic light sources interfere, such as two polarized light sources, they produce an optical grating pattern on a planar surface at a distance from them. For example in FIG. 1, an opaque screen (1) having two pinholes (2) at some distance apart is illuminated with a monochromatic light source (3). The pinholes act as two point sources of monochromatic light. When the overlapping light waves (4) strike a planar surface (5), such as a polymer surface, at some distance away they create an interference pattern. This optical grate is the result of the pattern of electric fields from the interfering light waves on the polymer surface. Where the waves completely cancel each other so that the electric field is zero, there is a dark band. Where the waves reinforce each other, there is a band that is more intense, or bright, than that from a single light source. Where the light sources are polarized, then within the bright bands there is a net orientation of the electric field. Only in regions of the polymer surface where there is an optical electrical field gradient along which there is a polarization component will experience a force. Therefore, the polymer chains move out from the light-irradiated regions to the non-irradiated regions. This migration of the polymer chains causes a microgrooved structure to form on the polymer surface. Microgrooves can be formed even when the polymer is at a temperature well below Tg during optical fabrication. When an optical surface grating is formed on a polymer film and the film is stored at a temperature below its Tg, the surface structure can be stable for several years.

An example of a suitable apparatus for exposing a polymer surface to an interference pattern of polarized light is described in Sukant Tripathy, et al., "Polarization Dependent Recordings of Surface Relief Gratings on Azobenzene Containing Polymer Films," *Appl. Phys. Lett.* (1996), 68, 2618, the teachings of which are incorporated by reference in their entirety. One or more of the polarized light sources of an intererence, pattern can be linearly polarized. In one embodiment, two light sources are linearly polarized and p-polarized. In another embodiment, one or more polarized light sources are circularly polarized. Preferably, two interfering polarized laser beams are employed that intersect at the polymer surface. In a particularly preferred embodiment, the angle between the laser beams is between about 10° and about 160°, and most preferably about 30°.

Appropriate selection of a polarized light source, or of an interference pattern of polarized light, as described above, will cause alignment of the anisotropic component of the polymer surface. Alignment of liquid crystal molecules of the liquid crystal medium will, in turn, be dictated by the alignment of anisotropic components. Optionally, the liquid crystal medium can be exposed to an electric filed or a supplemental heat source.

Figure 2:
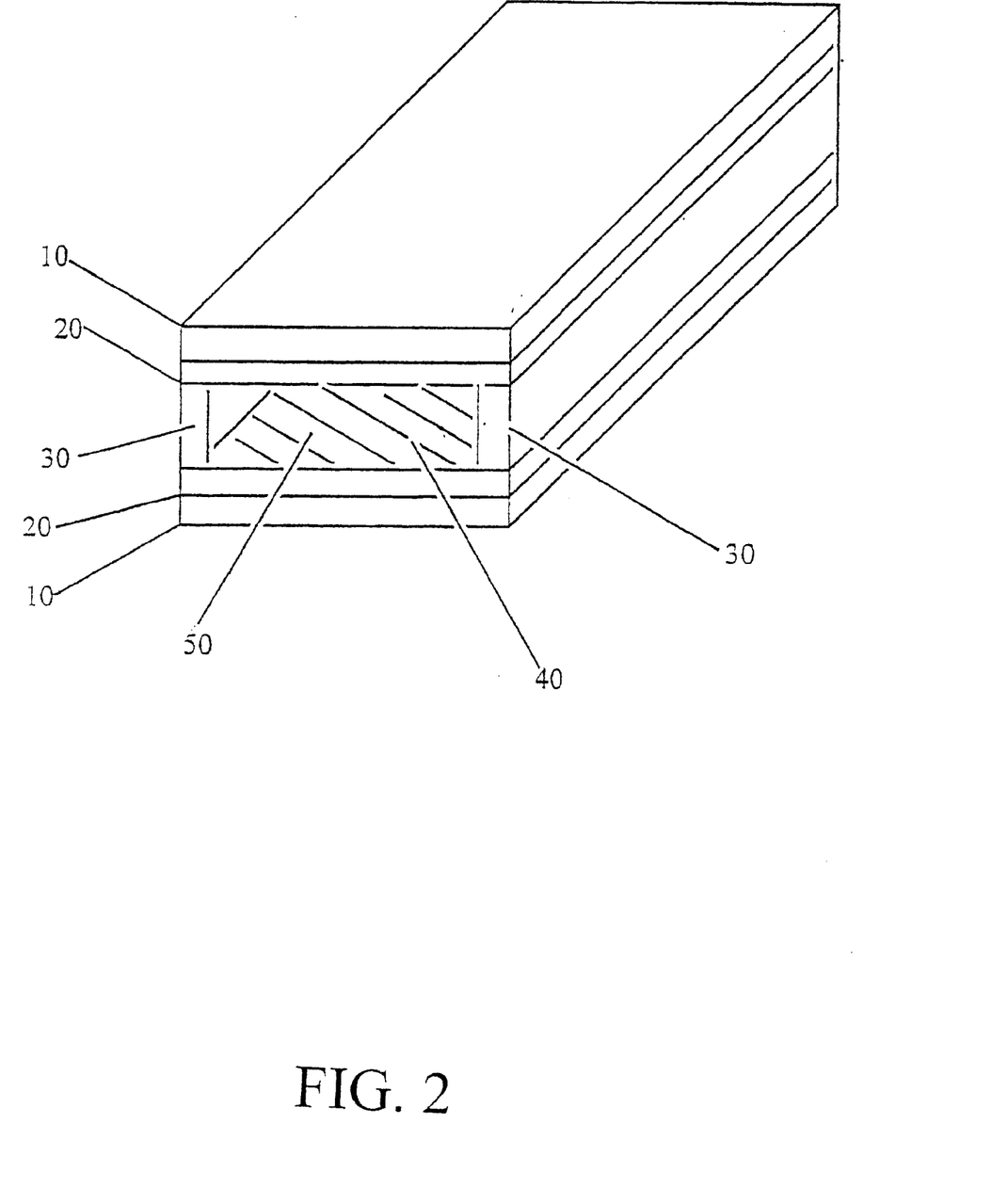
FIG. 2 is a section view of a liquid crystal cell of the invention.

As can be seen in FIG. 2, liquid crystal cell 109 of the invention, includes a schematic representation of a liquid crystal cell of the invention is shown in FIG. 2. Two glass plates (10) that have been coated with a thin film of a polymer (20) that have been optically fabricated with microgrooves (40) by the method of this invention are aligned with spacers (30) parallel to each other with their polymer films facing inward. The microgrooves (40) on the surface of each polymer film are aligned parallel to each other. A liquid crystal medium (50) contained between the two plates is aligned by contact with the polymer surface. It is to be understood that the liquid crystal cell of the invention includes any conventional design of liquid crystal cell that incorporates an internal polymer surface having an anisotropic component that is covalently bound to the polymer surface.

The method of forming a liquid crystal cell of the invention includes filling a cell, having at least one suitable polymer surface, with a suitable liquid crystal medium. The polymer surface of the cell can be exposed to polarized light, to thereby align the covalently bound anisotropic component, before and/or after the cell has been filled with the liquid crystal medium. In one embodiment, the anisotropic component is realigned by subsequent exposure to polarized light. Realignment of the anisotropic component can be limited to one or more portions of the polymer surface, thereby causing the liquid crystal medium to align in a corresponding pattern. It is to be understood that any of the methods and any of the materials described above with respect to the method of the invention are considered suitable and apply to the liquid crystal cell of the invention.

Examples of suitable applications of the liquid crystal cell of the invention include liquid crystal displays, optical switches, modulators and optical memories.

Exemplification

A. Synthesis of polymers having covalently attached side chain azobenzene groups.

1. Method 1

In a sealed tube, 7.5 g of bisphenol-A diglycidyl ether and 7.6 g of disperse orange 3 were heated at 140° C. for 4 h followed by 160° C. for 3 h. The product was dissolved in 1,4-dioxane and filtered, then precipitated in methanol. Polymers having anisotropic groups with the following structures were prepared by this procedure:

The Tg's of these polymers were all about 100° C. The anisotropic groups of polymers PDO3 and PNA could be orientated by exposure to linearly polarized light. In addition, PDO3 and PNA formed surface gratings when exposed to an interference pattern of two polarized light sources.

2. Method 2

Equimolar quantities of 1,4-cyclohexanedimethanol diglycidyl ether (5.127 g, 20 mmol) and aniline (1.863 g, 20 mmol) were homogeneously mixed while gradually heating to 110° C. The extent of reaction was followed by observing the disappearance of the IR absorption band the for epoxy ring. After 48 h, the reaction was complete, and the polymer was fractionated to remove the low molecular weight part as follows. The product (hereinafter "CH-AN") was dissolved in acetone (7 g in 20 mL), and the solution was diluted with excess methanol. The polymer slowly precipitated out and was collected and dried under vacuum for 24 h. The number average molecular weight was determined by gel permeation chromatography to be 3500 with a polydispersity index of 1.57.

In a separate flask, the diazonium salt of 4-aminobenzoic acid was prepared by adding an aqueous solution of sodium nitrite (0.08 g, 1.155 mmol in 0.5 mL water) dropwise to a dispersed mixture of 4-aminobenzoic acid (0.1371 g, 1 mmol) in a solution of sulfuric acid (0.12 mL) and glacial acetic acid (2 mL). After a clear solution of the diazonium salt was formed, the excess nitrous acid was decomposed by addition of sulfamic acid (0.1 g in 1 mL water). The diazonium salt solution was added dropwise into a dimethylforamide solution containing CH-AN (0.2796 g, 0.8 mmol) at 0° C. After the solution was stirred at 0° C. for 12 h, the mixture was poured into water under agitation while adding a few drops of hydrochloric acid. The precipitated azobenzene polymer (hereinafter "CH-1A-CA", see structure below) was collected by filtration and washed with plenty of water until the wash solution was neutral pH. The polymer was further purified by extracting repeatedly with chloroform. The solid was dried under vacuum for 24 h.

CH-1A-CA

CH-1A-CA had a Tg of 93° C. and formed surface gratings when exposed to an interference pattern of two polarized light sources. In addition, the azobenzene groups of CH-1A-CA could be orientated by exposure to linearly polarized light. For further details see Wang, X. et al., "Self-Assembled Second Order Nonlinear Optical Multilayer Azo Polymer," *Macromol. Rapid Commun.* (1997), 18, 451, the teachings of which are incorporated by reference in their entirety.

B. Synthesis of polymers having covalently attached azobenzene groups in the main chain of the polymer.

1. Method 1

4,4'-Diamino-azobenzene (1.0 g, 4.71 mmol) and isophorone diisocyanate (0.97 g, 4.40 mmol) were dissolved in anhydrous 1-methyl-2-pyrrolidone (22 mL) under nitrogen atmosphere. The reaction medium was heated at 95° C. for 48 h, cooled to room temperature, and then poured into 200 mL of vigorously stirred methanol. The resulting precipitates were filtered out, washed with methanol and acetone thoroughly, and dried in vacuum oven, yielding 1.49 g (78%) of the azo polymer (hereinafter "PU1", see structure below) as a dark yellow powder.

PU1

PU1 had a Tg of 197° C. Even with this high Tg, the azobenzene groups of PU1 could be orientated by exposure to linearly polarized light and formed surface gratings when exposed to an interference pattern of two polarized light sources.

2. Method 2

A 4 g (16.53 mmol) amount of 4-amino-4'-nitroazobenzene (Disperse Orange 3) was dissolved in ice-cooled acetic acid (100 mL) containing 8 mL of 98% sulfuriic acid. Sodium nitrite (1.48 g, 21.40 mmol) dissolved in a small amount of water (less than 2 mL) was added dropwise to the stirred solution. The reaction temperature was maintained at 5° C. After 6 h of stirring, 3,5-dimethylaniline (5.0 g, 41.30 mmol) in 10 mL of acetic acid was added followed by slow addition of sodium acetate (4.10 g, 50.0 mmol). The resulting red solution was stirred at 5° C. for an additional 16 h. A 10% sodium hydroxide solution was slowly added to neutralize the reaction mixture. The precipitates formed were collected by filtration, washed with water several times, dissolved in THF, and dried over magnesium sulfate. Solvent was evaporated, and a dark red powder was obtained by precipitation in n-hexane. The solid was further purified by column chromatography (silica gel; THF: n-hexane=4 6), affording 3.51 g (61%) of 4-[4'-(4"-nitrophenylazo)phenylazo]-3,5-dimethylaniline as a dark red solid product.

After purification, 4-[4'-(4"-nitrophenylazo)phenylazo]-3,5-dimethylaniline was dissolved in ethanol and heated to reflux. An aqueous solution of sodium hydrosulfide hydrate (0.15 g, 2.71 mmol in a minimum amount of water) was added, and the reaction mixture was refluxed for 30 min, then filtered. The residue was washed with chloroform, and the filtrate combined with the chloroform was washed with water and dried over magnesium sulfate. After evaporation of chloroform, 4-[4'-(4"-aminophenylazo)phenylazo]-3,5-dimethylaniline (0.14 g, 76%) was obtained by recrystallization in ethanol.

4-[4'-(4"-Aminophenylazo)phenylazo]-3,5-dimethylaniline (1.0 g, 2.90 mmol)and isophorone diisocyanate (0.64 g, 2.90 mmol) were dissolved in anhydrous 1-methyl-2-pyrrolidone (8 mL) under nitrogen atmosphere. The reaction medium was heated at 95° C. for 48 h, cooled to room temperature, and then poured into 200 mL of vigorously stirred methanol. The resulting precipitates were filtered out, washed with methanol and acetone thoroughly, and dried in vacuum oven, yielding 1.2 g (73%) of the azo polymer (hereinafter "PU2", see structure below) as a red powder.

PU2

PU2 had a Tg of 236° C. The azobenzene groups of PU2 could also be orientated by exposure to linearly polarized light and formed surface gratings when exposed to an interference pattern of two polarized light sources. For further details see Lee, T. S., et al., "Photoinduced Surface Relief Gratings in High-Tg Main-Chain Azoaromatic Polymer Films," *J. Polymer Sci.: Part A: Polymer Chemistry* (1998), 36, 283, the teachings of which are incorporated by reference in their entirety.

C. Fabrication of surface gratings.

The apparatus used for fabrication of a surface grating is described in Jiang, X. L., et al., "Polarization Dependant Recordings of Surface Relief Gratings on Azobenzene Containing Polymer Films," *Appl. Phys. Lett.* (1996), 68(19), 2618, the teachings of which are incorporated by reference in their entirety. When the anisotropic groups are azobenzene groups, an argon laser having a linearly polarized laser beam set at a wavelength of 488 nm or 514 nm was used. The polarized laser beam passes through a first half-wave plate. The orientation of the polarization was controlled by rotating this half-wave plate. The polarization states are defined with respect to the s-polarization state. In the s-polarization state ($\alpha=0°$), the electric field vector is parallel to the plane of the sample. Other polarization states are defined by the angle $\alpha$ that the electric field vector of the polarized light makes with respect to the s-polarization state. The p-polarization state is the state where the electric field vector has been rotated 90° ($\alpha=90°$) so that it is perpendicular to the plane of the sample. By replacing the first half-wave plate with a quarter-wave plate or a depolarizer, circularly polarized and unpolarized recording beams were obtained, respectively. After the polarization state of the beam has been adjusted by passing though the first half-wave plate, the beam was then expanded by the spatial filter and collimated into a parallel beam by the collimating lens. Half of the collimated beam was incident on the sample directly. The other portion of the beam was reflected onto the sample from an aluminum coated mirror. Due to the complex refractive index of aluminum, the polarization of the beam reflected from the mirror becomes elliptically polarized except for $\alpha=0°$ (s polarization) and $\alpha=90°$ (p polarization) which retain their original polarization state.

To create a condition where the two beams were linearly polarized with their polarization directions orientated orthogonal to each other, a p-polarized beam or an s-polarized beam is split into two beams. One beam is reflected off the aluminum mirror and maintains its polarization direction, while the other beam is passed through a second half-wave plate to rotate its polarization direction so that the two recording beams are orthogonally polarized. This recording state is called polarized recording.

The typical intensity of the recording beam after collimating lens was 55 mW/cm$^2$ and the recording time was about 45 min. The incident angle $\theta$ of the recording beams controls the spacing of the grating. $\theta$ was selected to be 14°, resulting in grating spacing of about 1 $\mu$m. The diffraction efficiency of the first order diffracted beam from the gratings in transmission mode was probed with an unpolarized low power He—Ne laser, which was used to monitor the grating formation process.

Good quality optical films of PDO3 were prepared by spin-casting on to glass slides. Table 1 shows the depth of the microgrooves (surface modulation) formed under different recording conditions as measured by atomic force microscopy. The diffraction efficiency of the low power He—Ne laser also indicates the extent of surface modulation.

TABLE 1

The diffraction efficiencies and surface modulations of under different recording conditions

| Recording conditions | Diffraction efficiency (%) | Surface modulation (Å) |
| --- | --- | --- |
| $\alpha = 0°$ | <0.01 | <100 |
| $\alpha = 8°$ | 0.4 | 250 |
| $\alpha = 16°$ | 5.5 | 1470 |
| $\alpha = 24°$ | 15 | 2140 |
| $\alpha = 45°$ | 27 | 3600 |
| $\alpha = 65°$ | 17 | 2770 |
| $\alpha = 90°$ | 15.2 | 2540 |
| Unpolarized | 16.5 | 2560 |
| Circularly polarized | 30 | 3500 |
| Polarization recording | <0.05 | <100 |

The data in Table 1 demonstrates that the polarization states of the writing beams significantly influenced the grating formation process. Grating formation is a complicated function of the polarization state of the writing beams. When the PDO3 film was exposed to p-polarized beams, significantly larger diffraction efficiencies were observed compared with the film exposed to s-polarized beams. Although the light intensity is comparable, the surface modulation, and consequently the diffraction efficiencies are considerably different.

Superposition of two recording beams with different polarization cause certain distributions of the resultant electric field in the film. The resultant electric field vector varies spatially and periodically in both magnitude and direction. It should be noted that since one recording beam is reflected from an aluminum coated mirror, the reflectivity of electric field is a complex number, and it makes the distribution of the resultant electric field more complicated except for the recording conditions with either s- or p-polarized beams.

In the case of intensity recording ($\alpha=0°$, two s-polarized beams), interference of the two recording beams with parallel polarization will give rise to the largest light intensity variation. However, the resulting electric field is always linearly polarized in the same direction over the entire irradiated area (i.e., there is no spatial alternation of the resultant electric field polarization). Very low diffraction efficiency and small surface modulation (<100 Å) were obtained from the grating recorded.

Under the polarization recording condition, the greatest alternation of the resultant electric field polarization occurs on the film, which results from the superposition of the field of the two recording beams with orthogonal polarization. However, the light intensity on the film is uniform over the entire irradiated area. Very small surface modulation and diffraction efficiency were also obtained under this recording condition.

Under the other recording conditions, which could be termed mixed recording conditions, variations of both light intensity and the resultant electric field polarization on the film exist. Surface relief gratings were formed with much greater values of diffraction efficiency and surface modulation than those from the $\alpha=0°$ recording or from polarization recording. This indicates that variations in both light intensity and resultant electric field polarization are essential to the formation of surface relief gratings. Under the recording condition of $\alpha=45°$, a very large diffraction efficiency of 27% and surface modulation as large as 3600 Å were obtained. The gratings recorded with circularly polarized and unpolarized laser beams also revealed large surface modulations with high diffraction efficiencies.

D. Alignment of liquid crystals on surface gratings.

The recording condition where $\alpha=90°$ produces a surface grating where the covalently bound azobenzene groups are orientated parallel to the direction of the microgrooves. Films produced under this recording condition homogeneously aligned liquid crystals in contact with the surface.

The azobenzene groups in a section of the polymer film were realigned by a second exposure to linearly polarized light. As a consequence, the liquid crystal medium in contact with the realigned section of the polymer realigned perpendicular to the polarization direction of the second linearly polarized light.

Surface gratings produced with a recording condition where $\alpha=45°$ did not uniformly align liquid crystals. Alignment was not observed because the polarization direction of the interference pattern was spatially varying.

Equivalents

While this invention has been particularly shown and described with references to preferred embodiments thereof, it will be understood by those skilled in the art that various changes in form and details may be made therein without departing from the spirit and scope of the invention as defined by the appended claims. Those skilled in the art will recognize or be able to ascertain using no more than routine experimentation, many equivalents to the specific embodiments of the invention described specifically herein. Such equivalents are intended to be encompassed in the scope of the claims.

What is claimed is:

1. A method of aligning a liquid crystal medium comprising exposing a polymer surface in contact with the liquid crystal medium to polarized light, said polymer surface having a covalently bound anisotropic component that aligns in response to the polarized light via photo-induced isomerization of the anisotropic component, thereby aligning the liquid crystal medium.

2. The method of claim 1 wherein the polymer surface is exposed to linearly polarized light.

3. The method of claim 1 wherein the polarized light to which the polymer surface is exposed is an interference pattern formed by polarized light from two or more polarized light sources.

4. The method of claim 3, wherein the interference pattern is formed by polarized light from at least a first polarized light source and a second polarized light source, and wherein the light from the first light source is linearly polarized.

5. The method of claim 4 wherein the light from the second light source is linearly polarized.

6. The method of claim 5, wherein the light from the first and the second light sources is p-polarized.

7. The method of claim 3 wherein the light from the first light source is circularly polarized.

8. The method of claim 7 wherein the light from the second light source is circularly polarized.

9. The method of claim 1 wherein the polarized light is emitted from a laser.

10. The method of claim 9 wherein the laser is an argon, helium-neon or helium-cadmium laser.

11. The method of claim 1 wherein the polarized light is emitted from an arc lamp.

12. The method of claim 11 wherein the arc lamp is a mercury or xenon lamp.

13. The method of claim 1 wherein the covalently bound anisotropic component is a dichroic dye.

14. The method of claim 13 wherein the covalently attached dichroic dye is an azobenzene group having the following structure:

wherein,
the aromatic rings can be substituted;
R is a hydrogen or a polymer;
X is absent or an oxygen, alkylene, sulfur, $-SO_2-$, $-CO_2-$, $-NR^1-$, $-CONR^1-$ or a spacer group;
$R^1$ is hydrogen, a substituted or unsubstituted aliphatic, or a substituted or unsubstituted aromatic group; and
n is zero or an integer from 1–5.

15. The method of claim 14 wherein at least one of the aromatic rings is substituted with an electron accepting group.

16. The method of claim 15 wherein the electron accepting group is a nitro group.

17. The method of claim 1 wherein the polymer has a Tg of greater than about 30° C.

18. The method of claim 1 wherein the liquid crystal medium includes at least one thermotropic nematic liquid crystal compound.

19. The method of claim 1 wherein the liquid crystal medium includes at least one thermotropic smectic liquid crystal compound.

20. The method of claim 1 wherein the liquid crystal medium includes at least one ferroelectric liquid crystal compound.

21. The method of claim 1 further including the step of exposing the liquid crystal medium to an electric field.

22. The method of claim 1 further including the step of exposing the liquid crystal medium to a supplemental heat source.

23. A method of aligning a liquid crystal medium comprising exposing a polymer surface in contact with the liquid crystal medium to an interference pattern of two polarized lights, said polymer surface having a covalently bound anisotropic component that aligns to form microgroovespon the polymer surface in response to the interference pattern of the polarized lights, thereby aligning the liquid crystal medium.

24. The method of claim 23 wherein a first light is linearly polarized.

25. The method of claim 24 wherein a second light is linearly polarized.

26. The method of claim 25 wherein the linearly polarized light is p-polarized.

27. The method of claim 23 wherein a first light is circularly polarized.

28. The method of claim 27 wherein a second light is circularly polarized.

29. The method of claim 23 wherein the two polarized lights are generated by the same light source.

30. The method of claim 29 wherein the light source is a laser.

31. The method of claim 30 wherein the laser is an argon, helium-neon or helium-cadmium laser.

32. The method of claim 29 wherein the light source is an arc lamp.

33. The method of claim 32 wherein the arc lamp is a mercury or xenon lamp.

34. A liquid crystal cell comprising:
 a) at least one polymer surface that has a covalently bound anisotropic component that can align in response to polarized light via photo-induced isomerization of the anisotropic component; and
 b) a liquid crystal medium in contact with said polymer surface.

35. The cell of claim 34 wherein the covalently bound anisotropic component is a dichroic dye.

36. The cell of claim 35 wherein the dichroic dye is an azobenzene having the following structure:

wherein,
 the aromatic rings can be substituted;
 R is a hydrogen or a polymer;
 X is absent or an oxygen, alkylene, sulfur, —SO$_2$—, —CO$_2$—, —NR$^1$—, —CONR$^1$— or a spacer group;
 R$^1$ is hydrogen, a substituted or unsubstituted aliphatic, or a substituted or unsubstituted aromatic group; and
 n is zero or an integer from 1–5.

37. The cell of claim 36 wherein at least one of the aromatic rings is substituted with an electron accepting group.

38. The cell of claim 37 wherein the electron accepting group is a nitro group.

39. The cell of claim 34 wherein the polymer has a Tg of greater than about 30° C.

40. The cell of claim 34 wherein the liquid crystal medium includes at least one thermotropic nematic liquid crystal compound.

41. The cell of claim 34 wherein the liquid crystal medium includes at least one thermotropic smectic liquid crystal compound.

42. The cell of claim 34 wherein the liquid crystal medium includes at least one ferroelectric liquid crystal compound.

43. A method of forming a liquid crystal cell comprising filling a cell with a liquid crystal medium, said cell having at least one polymer surface in contact with the liquid crystal medium, said polymer having a covalently bound anisotropic component that can align in response to polarized light via photo-induced isomerization of the anisotropic component, thereby aligning the liquid crystal medium.

44. The method of claim 43 further including the step of exposing the polymer surface to linearly polarized light.

45. The method of claim 44 wherein the polymer surface is exposed to linearly polarized light before the cell is filled with the liquid crystal medium.

46. The method of claim 44 wherein the polymer surface is exposed to linearly polarized light after the cell is filled with the liquid crystal medium.

47. The method of claim 43 further including the step of exposing the polymer surface to an interference pattern of two polarized lights after the cell is filled with the liquid crystal medium, to thereby align the liquid crystal medium.

48. The method of claim 47 further including the step of realigning at least a portion of the liquid crystal medium by exposing a portion of the polymer surface to a second interference pattern of two polarized lights.

49. The method of claim 47 further including the step of realigning at least a portion of the liquid crystal medium by exposing a portion of the polymer surface to a linearly polarized light.

50. The method of claim 43 further including the step of exposing the polymer surface to an interference pattern of two polarized lights before the cell is filled with the liquid crystal medium, whereby the liquid crystal medium aligns upon contact with the polymer surface.

51. The method of claim 50 further including the step of realigning at least a portion of the liquid crystal medium by exposing a portion of the polymer surface to an interference pattern of two polarized lights.

52. The method of claim 50 further including the step of realigning at least a portion of the liquid crystal medium by exposing a portion of the polymer surface to linearly polarized light.

53. A method of aligning a liquid crystal medium in a cell, said cell having at least one polymer surface in contact with the liquid crystal medium, comprising exposing the polymer surface to a polarized light source, said polymer surface having a covalently bound anisotropic component that aligns in response to the polarized light via photo-induced isomerization of the anisotropic component, thereby aligning the liquid crystal medium in the cell.

54. A method of aligning a liquid crystal medium in a cell, said cell having at least one polymer surface in contact with the liquid crystal medium, comprising exposing the polymer surface to an interference pattern of two polarized lights, said polymer surface having a covalently bound anisotropic component that aligns to form microgrooves on the surface of the polymer in response to the interference pattern of the polarized lights, thereby aligning the liquid crystal medium in the cell.

* * * * *